United States Patent [19]

Sakakibara et al.

[11] Patent Number: 4,721,753
[45] Date of Patent: Jan. 26, 1988

[54] DIENE POLYMER COMPOSITION CONTAINING COPOLYMER DERIVED FROM 2,3-DIMETHYL BUTADIENE

[75] Inventors: Mitsuhiko Sakakibara; Kaoru Nakako, both of Yokkaichi; Tatsuo Fujimaki, Higashimurayama, all of Japan

[73] Assignees: Bridgestone Corporation; Japan Synthetic Rubber Co., Ltd., both of Japan

[21] Appl. No.: 850,439

[22] Filed: Apr. 8, 1986

Related U.S. Application Data

[63] Continuation of Ser. No. 660,994, Oct. 15, 1984, abandoned.

[30] Foreign Application Priority Data

Oct. 14, 1983 [JP] Japan .................. 58-192202

[51] Int. Cl.$^4$ .................. C08L 9/00; C08L 15/00
[52] U.S. Cl. .................. 525/99; 525/232; 525/236; 525/245; 525/247; 525/314; 525/98; 526/120; 526/157; 526/337
[58] Field of Search .................. 526/120, 157; 525/314, 525/98, 232, 236, 99

[56] References Cited

U.S. PATENT DOCUMENTS

| | | | |
|---|---|---|---|
| 3,598,795 | 8/1971 | van den Berg et al. | 525/247 |
| 4,134,928 | 1/1979 | Moczygemba | 525/314 |
| 4,255,296 | 3/1981 | Ogawa et al. | 525/314 |
| 4,294,942 | 10/1981 | Henderson | 525/314 |
| 4,429,089 | 1/1984 | Pedretti et al. | 526/337 |

*Primary Examiner*—Wilbert J. Briggs, Sr.
*Attorney, Agent, or Firm*—Sughrue, Mion, Zinn, Macpeak, and Seas

[57] ABSTRACT

A diene polymer composition having improved fracture properties and a small change in the shape of extruded product is disclosed, which comprises at least 5% by weight of a copolymer composed of at least one conjugated diene (component A) having the following general formula:

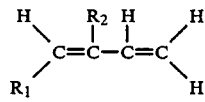

wherein $R_1$ and $R_2$ are a hydrogen atom or a methyl group, and 2,3-dimethylbutadiene (component B), said copolymer having a content of cis-1,4-bond of not less than 80%.

6 Claims, 1 Drawing Figure

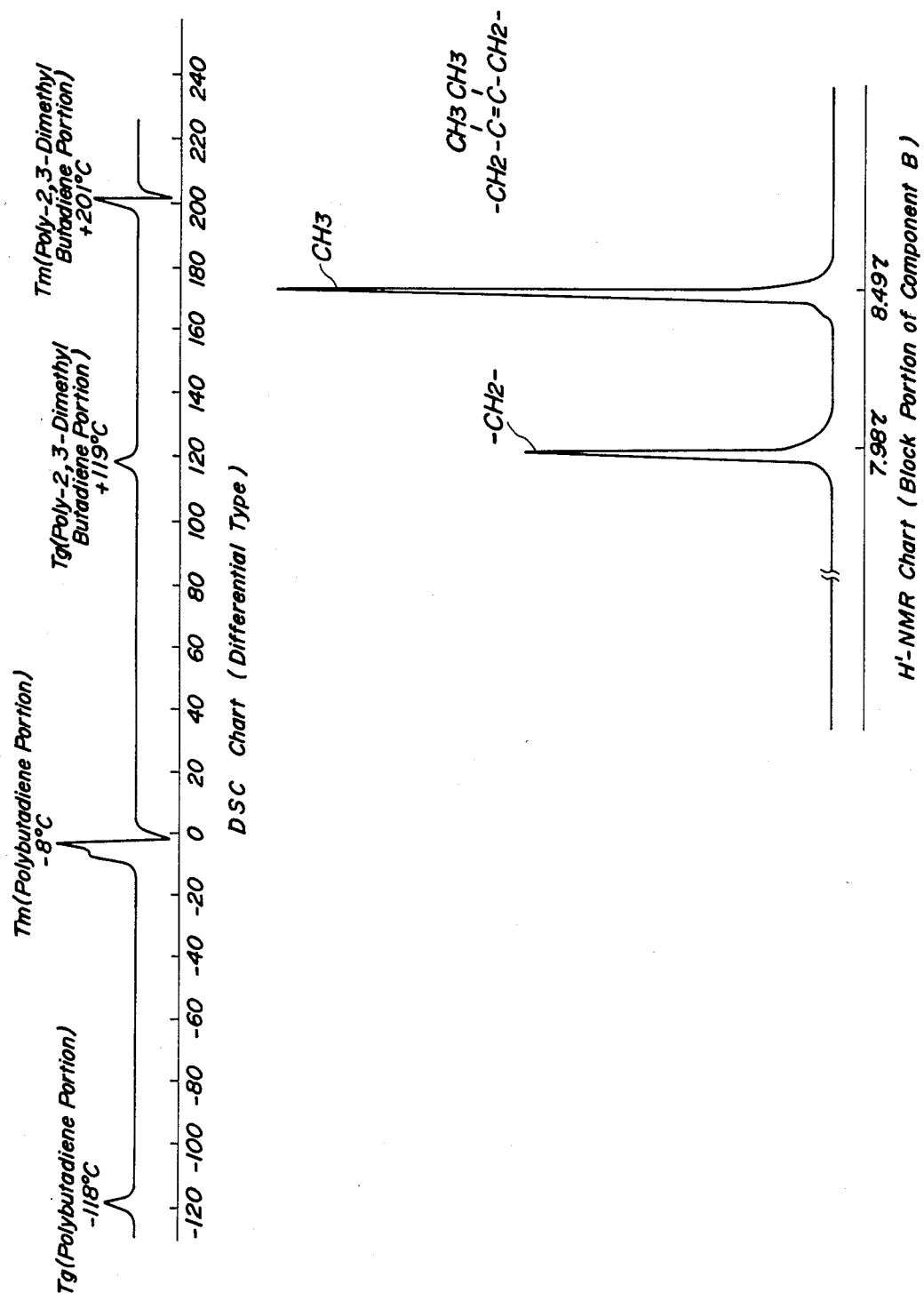

DIENE POLYMER COMPOSITION CONTAINING COPOLYMER DERIVED FROM 2,3-DIMETHYL BUTADIENE

This is a continuation of application Ser. No. 660,994 filed 10/15/84, now abandoned.

BACKGROUND OF THE INVENTION

1. Field of the Invention

This invention relates to novel diene polymer compositions and more particularly to a diene polymer composition containing a copolymer of conjugated diene and 2,3-dimethylbutadiene having a high content of cis-1,4-bond.

2. Description of the Prior Art

As regards polymers containing 2,3-dimethylbutadiene, it is known that the copolymers being relatively rich in trans-bond may be obtained by the use of an alkyl lithium catalyst or by radical polymerization (see, for example, U.S. Pat. No. 4,294,942 and No. 4,124,546).

However, 2,3-dimethylbutadiene copolymer having a high content of cis-1,4-bond has not yet been known.

SUMMARY OF THE INVENTION

It is an object of the invention to provide a diene polymer composition containing a 2,3-dimethylbutadiene copolymer with a high content of cis-1,4-bond, which has industrially useful and excellent fracture properties and a small change in the shape of extruded products.

According to the invention, there is the provision of a diene polymer composition comprising at least 5% by weight of a copolymer composed of at least one conjugated diene (component A) having the following general formula:

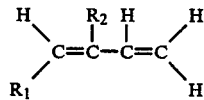

wherein $R_1$ and $R_2$ are a hydrogen atom or a methyl group, and 2,3-dimethylbutadiene (component B), said copolymer having a content of cis-1,4-bond of not less than 80%.

BRIEF DESCRIPTION OF THE DRAWING

A single FIGURE shows a DSC chart and a $H^1$-NMR chart with respect to the diene polymer of Example 2 according to the invention.

DETAILED DESCRIPTION OF THE INVENTION

In the copolymer composed of the components A and B according to the invention, it is preferable that the weight ratio of the component A to the component B is 95/5-10/90, the Mooney viscosity is 20-150, and the content of cis-1,4-bond is not less than 90% in order to provide more desirable fracture properties and small change in the shape of extruded products aimed at the invention.

The novel diene polymer composition according to the invention contains not less than 5% by weight, preferably not less than 15% by weight of the copolymer composed of the component A and the component B. When the amount of the copolymer is less than 5% by weight, the strength of the resulting vulcanizate (fracture properties) can not be improved.

The copolymer to be used in the diene polymer composition according to the invention can be preferably produced, for example, according to a method disclosed in Japanese Patent laid-open No. 58-1,709. For example, such a copolymer is produced by successively or simultaneously copolymerizing the conjugated diene monomer represented by the above general formula with 2,3-dimethylbutadiene in the presence of a catalyst system consisting of a lanthanum series compound having a general formula of $L_nY_3$ (wherein $L_n$ is a lanthanum series element having an atomic number of 57-71, Y is a halogen atom, a carboxylic acid residue, an alcohol residue or the like); an organoaluminium compound having a general formula of $R_3Al$, $R_mAlX_{3-m}$ or $R_nAlH_{3-n}$ (wherein R is an alkyl group having a carbon member of 1-18, X is a halogen atom, m is 1, 1.5 or 2, and n is 1 or 2) and a Lewis acid or Lewis base.

As $L_n$, use may be made of serium, praseodymium, neodymium and gadolinium, and particularly neodymium is preferably used because of its easy availability in the market. As the carboxyric acid, mention may be made acetic acid, isobutylic acid, n-valeric acid, pivalic acid, n-hexanoic acid, 2-ethylhexanoic acid (n-octanic acid) and the like. As the organoaluminium compound, mention may be made of a triethylaluminium, tri-n-propyl aluminium, tri-n-butylaluminium; diethylaluminium chloride, diethylaluminium bromide, di-n-propylaluminium chloride, ethylaluminium dichloride, sesquiethylaluminium chloride; diethylaluminium hydride, ethylaluminium dihydride; and the like. As the halogen atom, mention may be made of Cl, Br and I. As the alcohol, mention may be made of t-butyl alcohol, hexanol, octanol, neopentyl alcohol and the like.

Moreover, as the Lewis base, use may be made of acetylacetone, tetrahydrofuran, pyridine, N,N-dimethyl formamide, ethyl alcohol and the like.

As the Lewis acid, use may be made of halides such as aluminium chloride, tin tetrachloride, boron chloride and the like; alkyl-substituted halides and the like.

Such a catalyst system is prepared, for example, by reacting the lanthanum series compound with the Lewis base in the presence or absence of a suitable solvent at a temperature of $-50°-150°$ C. and further with the organoaluminium compound. It is preferable for improving the polymerization activity and shortening the induction time for polymerization initiation that a small amount of the conjugated diene is added at an optional step of the catalyst preparation to age it.

As the conjugated diene of the aforementioned general formula to be polymerized in the presence of the above catalyst system, use may be made of, for example, isoprene, 1,3-butadiene piperylene and the like.

The catalyst system has a living activity and selectively produces a polymer having a high content of cis-1,4-bond.

When the catalyst system having a high living activity (molar ratio of $AlR_3/L_n$ is small) is used in the invention according to successive charging system of both monomers, the resulting copolymer is substantially composed of a block copolymer consisting of polymer blocks of the component A and those of the component B. When the living activity of the catalyst system is low, the content of block copolymer decreases and the resulting copolymer further contains a homopolymers of the components A and B, respectively. In the latter case, the content of block copolymer is required to be not less than 5% by weight. If the content of block copolymer is not less than 5% by weight, the compatibility between the homopolymers of the components A and B can be enhanced to improve the fracture properties and the like. As mentioned above, the copolymer according to the invention is preferably a block copolymer composed of polymer block of the component A and those of the component B. Though the molecular weights of the component A, B are not particularly limited, it is preferable that the weight average molecular weights of the component A and the component B are usually 50,000–1,000,000 and 500–500,000, respectively. Such a block copolymer is produced by first polymerizing the component A in the presence of the catalyst system to obtain the block polymer A and adding the component B to this polymerization system. Further, the polymerization may be conducted by previously producing the block polymer B and then adding the component A thereto.

The amount of catalyst used can be varied in accordance with the molecular weight desired for the polymer. The polymerization is usually carried out by charging 1,000–500,000 mole, preferably 5,000–100,000 mole of the conjugated diene based on one mole of a carboxylate of a rare earth element in the catalyst system. The polymerization conditions are the same as in the polymerization of the conjugated diene using a nickel, cobalt or titanium catalyst system containing an organoaluminium as one component.

The polymerization reaction is usually conducted in a hydrocarbon solvent such as n-pentane, isopentane, n-hexane, n-heptane, cyclohexane, cycloheptane, benzene, toluene and mixtures thereof. The polymerization may also be conducted by adding the catalyst system to the monomer without using the solvent.

The polymerization temperature is usually within a range of $-30°$ C.–120° C., preferably 10° C.–80° C. The polymerization reaction may be performed according to either a batch process or a continuous process.

The content of cis-1,4-bond in the copolymer of the diene polymer composition obtained by the above process is not less than 80%. Moreover, the content of cis-1,4-bond in the polymer block of the component A is not less than 80%, usually not less than 90%, while the content of cis-1,4-bond of the polymer block of the component B is not less than 85%. The latter polymer block may be substantially a polymer having only the cis-1,4-bond depending upon the polymerization conditions.

Though a melting point (Tm) of the polymer block of the component B is varied depending upon various factors such as molecular weight, microstructure and the like, it is not less than 160° C., preferably 180° C.–270° C. in view of rubber fatigue properties.

The diene polymer composition according to the invention can contain at least one rubber selected from natural rubber and synthetic rubbers, for example, diene rubbers such as polyisoprene, styrene-butadiene copolymer, acrylonitrile-butadiene copolymer, polybutadiene and the like, and isoprene/isobutylene rubber, ethylene/propylene rubber, ethylene/propylene/diene rubber.

The composition according to the invention can preferably be used for applications such as tire, industrial goods and the like by adding usually used additives for rubber thereto and the vulcanizing them. Particularly, the composition according to the invention is characterized by having a small die swell and a good shape retention during extrusion.

The invention will be described in greater detail with reference to the following examples.

In each Example, the content of block polymer is calculated from a ratio of the weight of non-extracting matter to the weight of extractable matter by an extraction experiment with n-hexane at room temperature.

The microstructure of the polymer is measured by means of an NMR apparatus under the following conditions:
Solvent: dichlorobenzene
Measurement temperature: 180° C.
NMR apparatus: FT-100 Model made by Nippon Denshi K.K.

The melting point is measured by means of a differential thermal analysis meter (made by Du Pont Co., Ltd., DSC 910 Model) at a temperature rising rate of 20° C./min.

EXAMPLE 1

Into an autoclave of 5 l capacity were charged 1,250 g of cyclohexane, 200 g of 1,3-butadiene and 50 g of 2,3-dimethylbutadiene in a nitrogen atmosphere and then the temperature was adjusted to 50° C. In the another vessel, a catalyst system consisting of neodymium 2-ethylhexanoate/acetylacetone/diethylaluminium chloride/tri-isobutyl aluminium/di-isobutyl aluminium hydride with a molar ratio of 1/2/2.5/21/9 was prepared in the presence of a small amount of 1,3-butadiene and aged at 30° C. for 30 minutes.

The thus aged catalyst system was charged into the above autoclave so that neodymium was 1 mol based upon $1.0 \times 10^4$ mol of the monomer, after which the polymerization was carried out at 50° C. for 6 hours.

Then, the polymerization reaction was stopped by adding a solution of 2 g of 2,6-di-tert-butyl catechol in 5 ml of methanol. The degree of conversion was approximately 100%.

The resulting polymer solution was poured into methanol to recover a polymer.

Then, the polymer was dried on a hot roll (100° C.) in the usual manner to obtain 235 g of a product as a polymer. The Mooney viscosity ($ML_{1+4}$, 100° C.) was 48.

The resulting polymer was dissolved in a dichlorobenzene solvent and measured by means of the NMR apparatus, which by it was confirmed that a ratio of 2,3-dimethylbutadiene/1,3-butadiene was 18/82 (molar ratio) and the content of cis-1,4-bond was 95%. This polymer was compounded with other additives according to a compounding recipe as shown in the following Table 1 and vulcanized to obtain a vulcanizate having properties as shown in the following Table 2.

TABLE 1

| Compounding recipe and Vulcanizing conditions | |
|---|---|
| | Parts by weight |
| Polymer | 100 |
| Carbon black HFA | 50 |
| Stearic acid | 2 |
| Zinc oxide | 3 |
| Vulcanization accelerator CZ | 1.5 |
| Sulfur | 2.0 |
| Antioxidant 810NA | 1.0 |
| Press vulcanization at 145° C. for 20 minutes | |

TABLE 2

|  | Example | | | | | | Comparative Example 1 |
| --- | --- | --- | --- | --- | --- | --- | --- |
|  | 1 | 2 | 6 | 7 | 8 | 9 |  |
| Polymer formed in Example 1 | 100 |  |  |  |  |  |  |
| Polymer formed in Example 2 |  | 100 | 50 | 20 | 70 | 60 |  |
| Natural rubber |  |  | 50 | 80 |  |  |  |
| Polybutadiene rubber #BR01*[1] |  |  |  |  | 30 |  | 100 |
| Styrene-butadiene rubber #1500*[2] |  |  |  |  |  | 40 |  |
| Tensile strength*[3] (kg/cm$^2$) | 220 | 235 | 255 | 305 | 220 | 270 | 180 |
| Die swell*[4] | 20 | 13 | 32 | 48 | 29 | 30 | 72 |

*[1] made by Japan Synthetic Rubber K.K.
*[2] emulsion polymerized SBR
*[3] according to JIS K6301
*[4] measured by means of a slit die rheometer at 100° C. and $\dot{\gamma} = 10^{2.8}$ sec$^{-1}$. The die used had a size of 1.5 mm × 12 mm.

EXAMPLE 2

150 g of cyclohexane and 30 g of 1,3-butadiene (hereinafter abbreviated as BD) were charged into a pressure bottle of 300 ml capacity in a nitrogen atmosphere, after which the pressure bottle was capped. Separately, a catalyst system consisting of neodymium octanoate/acetylacetone/diethylaluminium monochloride/triethyl aluminium with a molar ratio of 1/2/2.5/40 was prepared in another vessel, aged in the presence of a small amount of 1,3-butadiene at room temperature for 30 minutes, and then charged into the above pressure bottle so that a ratio of BD/Nd was $1 \times 10^4$ (molar ratio), after which the polymerization reaction was conducted at 50° C.

The degree of conversion of 100% was confirmed after 60 minutes, after which 7.2 g of 2,3-dimethylbutadiene was charged and the polymerization was further conducted for 4 hours.

After the completion of the reaction, a solution of 0.5 g of 2,6-di-tert-butyl-catechol in 2 ml of methanol was added thereto to precipitate a polymer in methanol. The resulting polymer was dried in the same manner as described in Example 1 to obtain 37 g of a product as a polymer. The Mooney viscosity (ML$_{1+4}$, 100° C.) was 60. The measurement for the properties of this polymer was carried out by means of the NMR apparatus of FX-100 Model made by Nippon Denshi K.K. at 180° C. using a dichlorobenzene. As a result, the contents of 1,4-bond and 1,2-bond in total butadiene unit were 98% and 2%, respectively, and the content of 1,4-bond in total 2,3-dimethyl butadiene unit was 100% (see the single FIGURE). Tm was 210° C.

The content of block polymer was 30% by weight.

The DSC chart and the NMR chart of the resulting polymer were shown in the single FIGURE.

EXAMPLE 3

400 g of cyclohexane and 90 g of 1,3-butadiene (hereinafter abbreviated as BD) were charged into an autoclave of 1 l capacity in a nitrogen atmosphere, after which the pressure bottle was capped. Separately, a catalyst system consisting of neodymium octanoate/acetylacetone/diethylaluminium monochloride/triisobutyl aluminium with a molar ratio of 1/2/2.5/25 was prepared in another vessel, aged in the presence of a small amount of 1,3-butadiene at 50° C. for 30 minutes, and then charged into the above autoclave so that a ratio of BD/Nd was $5 \times 10^3$ (molar ratio), after which the polymerization reaction was conducted at 50° C. for 18 hours.

The degree of conversion of 100% was confirmed after 60 minutes, after which 10 g of 2,3-dimethylbutadiene was charged and the polymerization was further conducted for 4 hours.

After the completion of the reaction, a solution of 0.5 g of 2.6-di-tert-butyl-catechol in 2 ml of methanol was added thereto to precipitate a polymer in methanol. The resulting polymer was dried in the same manner as described in Example 1 to obtain a rubbery polymer. The Mooney viscosity (ML$_{1+4}$, 100° C.) was 45. The measurement for the properties of this polymer was carried out by means of the NMR apparatus of FX-100 Model made by Nippon Denshi K.K. at 180° C. using a dichlorobenzene. As a result, the contents of 1,4-bond and 1,2-bond in total butadiene unit were 98% and 2%, respectively, and the content of 1,4-bond in total 2,3-dimethyl butadiene unit was 100%. Tm was 210° C.

The content of block polymer was 60% by weight.

This polymer was compounded with other additives according to the compounding recipe shown in Table 1 and vulcanized to obtain a vulcanizate having a tensile strength of 225 Kg/cm$^2$ and a die swell of 18%.

EXAMPLES 4, 5

A polymer was obtained in the same manner as described in Example 2, except that isoprene or pentadiene was used as the monomer of the component A. The Mooney viscosities (ML$_{1+4}$, 100° C.) of the resulting polymers were 55 and 52, respectively.

As regards the microstructure, the content of 1,4-bond in total polyisoprene unit was 99%, the content of 1,4-bond in total pentadiene unit was 97%, and the content of 1,4-bond in total poly-2,3-dimethylbutadiene unit of each copolymer was 100%. Tm of total poly 2,3-dimethylbutadiene unit was 202° C. when the component A was isoprene, and 198° C. when the component A was pentadiene. The contents of block polymer were 25% and 20%, respectively.

EXAMPLES 6-9

The polymer obtained in Example 1 or 2 was blended with a general-purpose rubber (natural rubber, polybutadiene rubber, emulsion polymerized SBR) and evaluated in the same manner as described in Example 1 to obtain results shown in Table 2.

COMPARATIVE EXAMPLE 1

A rubber composition containing polybutadiene as a polymer was evaluated in the same manner as described in Example 1 to obtain results shown in Table 2.

COMPARATIVE EXAMPLE 2

Into an autoclave of 5 l capacity were charged 1,250 g of cyclohexane, 200 g of 1,3-butadiene and 50 g of 2,3-dimethylbutadiene in a nitrogen atmosphere and then the temperature was adjusted to 50° C. Then, 0.17 g of n-butyl lithium was charged into the above autoclave, after which the polymerization was carried out at 50° C. for 6 hours.

Then, the polymerization reaction was stopped by adding a solution of 2 g of 2,6-di-tert-butyl catechol in 5 ml of methanol. The degree of conversion was approximately 100%.

The resulting polymer solution was poured into methanol to recover a polymer.

Then, the polymer was dried on a hot roll (100° C.) in the usual manner to obtain 230 g of a product as a polymer. The Mooney viscosity ($ML_{1+4}$, 100° C.) was 45.

The resulting polymer was dissolved in a dichlorobenzene solvent and measured by means of the NMR apparatus, which by it was confirmed that a ratio of 2,3-dimethylbutadiene/1,3-butadiene was 18/82 (molar ratio), the content of cis-1,4-bond was 34%, the content of trans-1,4-bond was 51% and the content of vinyl bond was 15%. This polymer was compounded with other additives according to the compounding recipe shown in Table 1 and vulcanized to obtain a vulcanizate having a die swell of 60% and a tensile strength of 178 Kg/cm².

What is claimed is:

1. A diene polymer composition comprising at least 5% by weight of a copolymer composed of at least one conjugated diene (component A) having the following general formula:

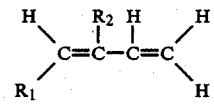

wherein $R_1$ and $R_2$ are a hydrogen atom or a methyl group, and 2,3-dimethyl butadiene (component B), wherein said copolymer is produced by polymerizing components A and B at a weight ratio of component A/component B of 95/5–10/90 in the presence of a catalyst system consisting of:

(A) a lanthanum series compound having the following general formula: $L_nY_3$, wherein $L_n$ is a lanthanum series element having an atomic number of 57–71, Y is a halogen atom, a carboxylic acid residue or (B) an organo-aluminum compound having the following general formula: $R_3Al$, $R_mAlX_{3-m}$ or $R_nAlH_{3-n}$, wherein R is an alkyl group having 1–18 carbon atoms, X is a halogen atom, m is 1, 1.5 or 2, and n is 1 or 2, and (C) a Lewis acid or Lewis base, wherein said copolymer has a cis-1,4-bond content of not less than 80% and a Mooney viscosity of 20–150.

2. The diene polymer composition according to claim 1, wherein said copolymer is a block copolymer composed of a polymer block of component A and a polymer block of component B obtained by copolymerization with component B after the polymerization of component A.

3. The diene polymer composition according to claim 1, wherein said copolymer has a cis-1,4-bond content of not less than 90%.

4. The diene polymer composition according to claim 1, wherein said composition comprises not less than 15% by weight of said copolymer.

5. The diene polymer composition according to claim 1, wherein said copolymer has a cis-1,4-bond content in the total polymer unit of component A of not less than 80% and a cis-1,4-bond content in the total polymer unit of component B of not less than 85%.

6. A diene polymer composition according to claim 1, wherein said composition further contains at least one rubber selected from the group consisting of natural rubber, polyisoprene, styrene-butadiene copolymer, acrylonitrile-butadiene copolymer, polybutadiene, isoprene/isobutylene rubber, ethylene/propylene rubber and ethylene/propylene/diene rubber.

* * * * *